United States Patent
Nishikori et al.

(12) 
(10) Patent No.: US 6,555,240 B1
(45) Date of Patent: Apr. 29, 2003

(54) FILM LAMINATES FOR PRINTING

(75) Inventors: Yoshiharu Nishikori, Kawasaki (JP); Koichi Katayama, Tokyo (JP); Yuichi Ogawa, Utsunomiya (JP); Noboru Sakaushi, Tokyo (JP)

(73) Assignee: Oji Paper Co., Ltd., Tokyo (JP)

( * ) Notice: Subject to any disclaimer, the term of this patent is extended or adjusted under 35 U.S.C. 154(b) by 166 days.

(21) Appl. No.: 09/721,020

(22) Filed: Nov. 21, 2000

(30) Foreign Application Priority Data

Nov. 24, 1999 (JP) ............................................. 11-332433
Mar. 17, 2000 (JP) ........................................ 2000-075855
Mar. 17, 2000 (JP) ........................................ 2000-075856
Mar. 17, 2000 (JP) ........................................ 2000-075858

(51) Int. Cl.⁷ .............................................. B32B 27/32
(52) U.S. Cl. ....................... 428/461; 428/910; 428/409; 428/523; 428/515; 428/516; 428/517; 428/519; 428/462; 427/536; 427/540; 427/535; 427/534; 427/533
(58) Field of Search ................................ 428/409, 523, 428/910, 515, 516, 517, 519, 461, 462; 427/536, 540, 535, 534, 533

(56) References Cited

U.S. PATENT DOCUMENTS 5,695,905 A   12/1997   Savariar-Hauck et al. .. 430/162
5,729,266 A   3/1998   Malhotra .................... 347/102
6,194,061 B1 * 2/2001   Satoh et al. ................. 428/341

FOREIGN PATENT DOCUMENTS

JP           2000159915      6/2000
WO          WO 00/37260     6/2000

OTHER PUBLICATIONS

U.S. patent application Ser. No. 09/280,714, filed Mar. 30, 1999.

* cited by examiner

Primary Examiner—William P. Watkins, III
(74) Attorney, Agent, or Firm—Christie, Parker & Hale, LLP

(57) ABSTRACT

A film laminate for printing comprises a polyolefin film in which at least one side is surface-modified and an anchor layer formed on the surface-modified side of the polyolefin film and containing an oxazoline group-modified resin. The film laminate is prepared by subjecting at least one side of a longitudinally oriented polyolefin film to a corona discharge treatment, forming an ethylene-acrylic acid type copolymer layer on the corona discharge-treated side of the film, laterally orienting the film, and then forming an anchor layer comprising a binder resin, and an oxazoline group-modified resin, on the modified surface of the surface-modified polyolefin film subjected to the corona discharge treatment. The film laminate for printing is excellent in its transparency and it is also excellent in the adhesion to a coated layer.

23 Claims, No Drawings

FILM LAMINATES FOR PRINTING

BACKGROUND OF THE INVENTION

The present invention relates to a highly transparent easily adhesive film and more specifically to a highly transparent easily adhesive film, which is a polypropylene film excellent in transparency and which is also excellent in the adhesion to a coated layer. The coated layer is excellent in the printability through the photogravure, relief printing, offset printing, flexography or the like, or capable of recording information through the ink jet recording technique.

A polypropylene film based on polypropylene, propylene copolymer or mixture thereof has widely been used as a film for packaging because of its excellent properties such as mechanical strength and transparency. On the other hand, it has been known that the polypropylene film has insufficient adhesion to a coated film applied onto the surface thereof. In this regard, the coated film is in general applied to the polypropylene film in order to impart various functions such as gas barrier properties, heat sealability and printability to the polypropylene film. This would be attributable to poor adhesive properties of the polypropylene film. There have been proposed a variety of means for eliminating this drawback, such as insertion of various anchor layers between the coated layer and the polypropylene film.

For instance, Japanese Examined Patent Publication No. Sho 45-32360 discloses a method, which makes use of a polyethyleneimine and a glycidyl type epoxy resin in such an anchor layer in order to improve the adhesive properties of a polypropylene film to a polyvinylidene chloride layer. The latter layer is applied to the polypropylene film for imparting gas barrier properties thereto. In addition, U.S. Pat. No. 3,023,126 discloses the use of an anchor layer comprising an isocyanate as a component thereof.

However, these methods have still been insufficient in the improvement of the adhesive properties of the polyolefin films and the use of only such an anchor layer has never permitted the printing operation with UV inks.

SUMMARY OF THE INVENTION

Accordingly, it is an object of the present invention to provide a highly transparent easily adhesive film, which can eliminate the foregoing drawbacks associated with the conventional techniques, more particularly, to provide the film which permits the production of a laminate film excellent in printability through, for instance, the photogravure, relief printing, offset printing and flexography, simply using an anchor layer. The film also has improved adhesion to a functional coated layer to be applied onto the anchor layer.

Another object of the present invention is to provide an adhesive sheet, which is an indicating label comprising a printable transparent film as a surface base material and which is used as a label for transparent containers. The adhesive sheet has an excellent ability of being printed through the conventional printing methods and is also excellent in adhesion to ink during the UV flexography, in transparency and is less susceptible to discoloration with light rays.

A still another object of the present invention is to provide a metal-deposited (for instance, aluminum-deposited) polyolefin film suitably used as, for instance, indicating labels.

According to a first aspect of the present invention, there is thus provided a laminate of films for printing, wherein an anchor layer containing an oxazoline group-modified resin is formed on the modified surface of a polyolefin film, at least one side of which is surface-modified.

According to a second aspect of the present invention, there is provided a laminate of films for printing, wherein at least one side of a longitudinally stretched polyolefin film is subjected to a corona discharge treatment, that an ethylene-acrylic acid type copolymer layer is formed on the corona discharge-treated surface, and that after the polyolefin film is stretched in the lateral direction, an anchor layer comprising a binder resin selected from the group consisting of acrylic resins, polyester resins and SBR resins and an oxazoline group-modified resin is applied onto the modified surface of the surface-modified polyolefin film, which has been subjected to the corona surface-treatment.

According to a third aspect of the present invention, there is further provided the foregoing laminate of films in which an adhesive layer is formed on the surface of the surface-modified polyolefin film opposite to the surface thereof to which the anchor layer is applied.

According to a fourth aspect of the present invention, there is provided the foregoing laminate of films in which an adhesive layer, for metal vapor-deposition, containing an anti-blocking agent is formed on the surface of the surface-modified polyolefin film opposite to the surface thereof to which the anchor layer is applied and a vapor-deposited metal layer is applied onto the adhesive layer.

According to a fifth aspect of the present invention, there is provided the foregoing laminate of films, in which the surface-modified polyolefin film is a surface-roughened polyolefin sheet and in which a vapor-deposited metal layer is present on the surface of the sheet opposite to that carrying the anchor layer.

According to a sixth aspect of the present invention, there is provided a method for preparing a laminate of films for printing. The method comprises the steps of subjecting, to a corona discharge treatment, at least one side of a longitudinally stretched polyolefin film; forming an ethylene-acrylic acid type copolymer layer on the corona discharge-treated surface of the polyolefin film; stretching the polyolefin film in the lateral direction; and then forming an anchor layer, which comprises a binder resin selected from the group consisting of acrylic resins, polyester resins and SBR resins and an oxazoline group-modified resin on the modified surface of the surface-modified polyolefin film, which has been subjected to the corona discharge treatment.

BEST MODE FOR CARRYING OUT THE INVENTION

A biaxially oriented polyolefin film in which at least one side thereof is surface-modified is preferably used in the present invention.

This biaxially oriented polyolefin film in which at least one side thereof is surface-modified is prepared as follows: A polyolefin composition is melt-extruded according to the usual method and then the melt-extruded composition is first oriented in its longitudinal direction to give a uniaxially oriented film. Thereafter, the longitudinally oriented polyolefin film is further oriented in the lateral direction. The thickness of the film obtained after the lateral orientation is not restricted to any particular range, but it preferably ranges from 15 to 100 μm. In general, the draw ratio: longitudinal/lateral orientation of the film preferably ranges from 2 to 10.

In the present invention, a layer is formed by applying ethylene-acrylic acid type copolymer paint onto at least one side of the film and then drying after the longitudinal orientation and before the lateral orientation to thus surface-modify the polyolefin film. In this respect, a film is in general longitudinally oriented while making use of the difference in the peripheral speed between rolls. For this reason, if the layer is applied before the longitudinal orientation of the film, the coated surface of the film comes in contact with the surface of these rolls during the longitudinal orientation. Accordingly, the film is not uniformly surface-modified and this in turn results in the reduction of adhesion to the anchor layer. On the other hand, the application of the layer after the lateral orientation of the film would leads to a decrease of the adhesion between the polyolefin composition and the ethylene-acrylic acid type copolymer.

In this respect, examples of methods for surface-modification are a corona discharge treatment and/or a flame treatment, with the corona discharge treatment being preferred. In addition, examples of the methods include surface-roughened methods (1) to (6) which will be described later.

As the polyolefin composition used in the present invention, there may be listed, for instance, polyethylene (irrespective of the density thereof), polypropylene and polybutene, with polypropylene being more preferred.

The term "polypropylene" herein means not only homopolymer of propylene, but also copolymers of propylene with copolymerizable other monomers such as α-olefins represented by ethylene, butene and 4-methylpentene, aromatic olefins represented by styrene, and dienes represented by butadiene; or any known blend of propylene homopolymers and/or copolymers and other polymers and/or copolymers inasmuch as the blend does not lose characteristic properties peculiar to the polypropylene film.

In this connection, the foregoing polyolefin composition may if necessary comprise other additives such as a lubricating agent, an antistatic agent, an antioxidant, a UV absorber and a pigment.

Examples of ethylene-acrylic acid type copolymers usable in the present invention are at least one member selected from the group consisting of ethylene-(meth)acrylic acid ester-(meth)acrylic acid copolymers and ethylene-(meth)acrylic acid ester-(meth)acrylic acid salt copolymers, ethylene-(meth)acrylic acid ester-maleic anhydride copolymers, and ethylene-glycidyl (meth)acrylic acid ester copolymers.

The ethylene-acrylic acid type copolymer is preferably a random copolymer and 30 to 90% by weight of the components thereof is preferably occupied by ethylene moiety. In addition, the (meth)acrylic acid salt is not limited to any specific one in so far as they are metal salts and may be, for instance, sodium, potassium, calcium, lithium, magnesium and barium salts.

The ethylene-acrylic acid type copolymer is preferably converted into an aqueous paint by any known compulsory emulsification method. The ethylene-acrylic acid type copolymer paint may comprise a pigment for preventing any occurrence of blocking. The method for applying the ethylene-acrylic acid type copolymer paint is not restricted to any particular one and the paint may thus be applied according to any known method. Examples of such application methods are a Meyer bar coating method, a gravure coating method, a micro-gravure coating method, a die coating method, a blade coating method, a micro-rod coating method, an air knife coating method, a curtain coating method, a slide coating method and a roll coating method, but the coating method is not restricted to these specific ones.

The coated amount of the ethylene-acrylic acid type copolymer as determined after the lateral orientation preferably ranges from 0.01 to 1 g/m² in the present invention.

Regarding the pigment included in the polyolefin film, at least one side of which is surface-modified, used in the present invention, it is preferred that the amount of the pigment be not more than 2000 ppm (0.2% by weight) for the polyolefin composition. On the other hand, the amount of the pigment preferably ranges from 0.1 to 10% by weight for the ethylene-acrylic acid type copolymer, which constitutes the modifying layer. More preferably, it is not more than 300 ppm for the polyolefin composition and 0.5 to 5% by weight for the modifying layer or the ethylene-acrylic acid type copolymer.

The pigment used in the present invention is not restricted to any particular one and may be any known inorganic pigments and organic pigments. Examples of inorganic pigments include kaolin, silica, calcium carbonate, aluminum hydroxide, talc, zeolite, mica powder and titanium oxide. On the other hand, examples of organic pigments are acrylic, styrenic, polyolefinic pigments and copolymers thereof. The organic pigments may be crosslinked ones for imparting solvent-insolubility to the pigments.

In the present invention, an anchor layer is formed on the polyolefin film, at least one side of which is surface-modified. The anchor layer may be formed on one or both sides thereof.

The principal component of the anchor layer used in the present invention is an oxazoline group-modified resin which may be optionally used with a binder resin. The anchor layer preferably comprises an oxazoline group-modified resin and a binder resin, more preferably consists of them.

The oxazoline group-modified resin is preferably present in the anchor layer in an amount ranging from 2 to 50% by weight and more preferably 5 to 20% by weight.

The term "oxazoline group-modified resin" herein means any resin in which oxazoline groups are present. Examples thereof include acrylic resins, polyester resins, SBR resins, and polyolefin resins to which oxazoline groups are graft-bonded.

The binder resin as a component of the anchor layer may be at least one member selected from the group consisting of, for instance, acrylic resins, polyester resins and SBR resins.

In the present invention, the coated amount of the anchor layer preferably ranges from 0.05 g/m² to 1 g/m². The coated amount thereof more preferably ranges from 0.1 g/m² to 0.5 g/m².

The anchor layer may comprise a pigment for inhibiting the occurrence of any blocking. The amount of the pigment to be incorporated into the anchor layer is preferably not more than 5% by weight.

In the present invention, a functionality-imparting layer may be formed on the anchor layer of the highly transparent and easily adherent film prepared according to the foregoing procedures, depending on various purposes.

The functionality-imparting layer is not restricted to specific ones inasmuch as they can impart desired functions to the transparent adhesive film and they may be either transparent or opaque. For instance, a layer capable of forming characters, images or the like on the film may be applied onto the anchor layer by applying, through printing, a layer with an ink such as a UV ink, a gravure printing ink and a thermal transfer ink.

Moreover, a heat-sensitive recording medium can be produced by applying, onto the highly transparent and easily adherent film, a recording layer such as a layer having a heat-sensitive recording ability or a heat-sensitive recording layer, which comprises, for instance, a leuco dye, a developer and/or a sensitizer. Such a heat-sensitive layer may be applied onto the film according to any known method and it is a matter of course to apply an under coat layer and/or an overcoat layer onto the heat-sensitive recording layer. Examples of such functionality-imparting layers further include those possessing abilities of ink-jet recording, melt thermal transfer recording, thermal sublimation transfer recording, electrostatic recording, pressure-sensitive recording, PPC recording and magnetic recording, as well as printing ink-receiving layers.

In the present invention, the film may be subjected to a corona discharge treatment and/or a flame treatment even in any step (after longitudinal orientation, after lateral orientation, before and after application of an anchor layer, before and after application of a functionality-imparting layer and/or before and after printing).

In the present invention, the resulting highly transparent and easily adherent film may be subjected to an overlaminating treatment according to any known method. Alternatively, the resulting film may be subjected to any fabricating treatment such as a treatment in which the film is used as surface paper and it is laminated with an adhesive layer and/or a release sheet to thus give an adhesive sheet. In the present invention, however, any fabricating treatment usable herein is not restricted to specific ones.

In case the foregoing film laminate (an adhesive sheet) wherein an adhesive layer is formed on the side of the surface-modified polyolefin film opposite to the side onto which an anchor layer is applied, according to the present invention, a release sheet is preferably applied onto the adhesive layer. In addition, if the resulting adhesive sheet is used as an indicating label, the thickness of the polyolefin film desirably ranges from about 20 to 200 $\mu$m and preferably about 20 to 100 $\mu$m.

An adhesive used in the present invention as a constituent is not restricted to any specific one and may be, for instance, a rubber type, acrylic, vinyl ether type, urethane type or silicone type one, which may be in the form of a solution, an emulsion or a hot melt. In particular, acrylic adhesives comprising, as principal components, acrylic premonomers, acrylic monomers or the like are preferably used in the present invention, from the viewpoint of their transparency and weatherability.

Such an acrylic adhesive is not restricted to any particular one and examples thereof are acryl group-containing vinyl monomers, epoxy group-containing vinyl monomers, alkoxy group-containing vinyl monomers, ethylene oxide group-containing vinyl monomers, amino group-containing vinyl monomers, amido group-containing vinyl monomers, halogen atom-containing vinyl monomers, phosphate residue-containing vinyl monomers, sulfonate residue-containing vinyl monomers, silane group-containing vinyl monomers, phenyl group-containing vinyl monomers, benzyl group-containing vinyl monomers, tetrahydrofurfuryl group-containing vinyl monomers and other copolymerizable monomers. The foregoing acrylic resins are polymerized by any method such as the bulk polymerization, solution polymerization, suspension polymerization and emulsion polymerization in which a water-insoluble of hardly water-soluble monomer is dispersed in water together with an emulsifying agent, followed by polymerization thereof in the presence of a water-soluble initiator. Among the acrylic resins prepared by these methods, preferred be adhesives prepared by the emulsion polymerization. This is because the emulsion polymerization permits the achievement of a high cohesive force without using any crosslinking agent and the polymerization method permits the saving of energy and is not harmful to the environment.

A variety of additives may if necessary be incorporated into these acrylic adhesives for the improvement of the adhesive properties thereof. Examples of such additives are adhesiveness-imparting agents, for instance, naturally occurring resins such as rosin, modified rosin, rosin and modified rosin derivatives, polyterpene resins, modified terpene, aliphatic hydrocarbon resins, cyclopentadiene resins, aromatic petroleum resins, phenol resins, alkyl-phenol-acetylene resins, cumarone-indene resins and vinyl toluene-$\alpha$-methylstyrene copolymers; age-resistors; stabilizers; softening agents such as oils; and fillers. These additives may be used alone or in any combination of at least two of them. Moreover, it is also possible to add, to the adhesive layer, an organic UV absorber such as a benzophenone type or benzotriazole type one in order to improve the weatherability thereof.

The adhesive layer can be formed by applying the foregoing adhesive to a release sheet, drying the coated adhesive if necessary to form an adhesive layer and then combining the adhesive layer with a surface base material. Thus, an adhesive sheet according to the present invention can be prepared. This adhesive layer may be applied using a device such as a reverse roll coater, a knife coater, a bar coater, a slot die coater, an air knife coater, a reverse gravure coater and a variogravure coater. The coated amount of the adhesive weighed after drying is preferably adjusted to the range of from 5 to 50 g/m$^2$ and more preferably 10 to 30 g/m$^2$. This is because if the coated amount of the adhesive is less than 5 g/m$^2$, the adhesive force of the adhesive to the adherend becomes insufficient. On the other hand, if it exceeds 50 g/m$^2$, the coated adhesive may squeeze out and the resulting product may have insufficient printability.

The release sheet applied for covering the adhesive layer is not restricted to any particular one. Examples thereof conveniently used herein are a dense substratum such as glassine paper, clay-coated paper, paper obtained by laminating kraft paper or wood free paper with a film such as a polyethylene film, paper obtained by coating wood free paper with, for instance, polyvinyl alcohol or an acrylic acid ester copolymer resin, those obtained by applying, for instance, a fluoroplastic or a silicone resin onto a plastic film such as polyethylene terephthalate or polypropylene in an amount, weighed after drying, of 0.05 to 3 g/m$^2$ and then subjecting the resin to thermosetting, electron radiation curing or the like to form a release layer.

The release layer may conveniently be applied using a coating device such as a bar coater, an air knife coater, a direct gravure coater, an offset gravure coater, or a multi-stage roll coater. In this respect, a release sheet comprising a plastic film rather than a paper-type release sheet is preferably used in case where high transparency is required, from the viewpoint of the transparency and surface smoothness. Moreover, a release sheet comprising a plastic film is preferred as compared with the paper-type one since the former is not susceptible to temperature and humidity and hardly causes curling as compared with the latter.

The adhesive sheet thus prepared after removing the release sheet of a plastic film or the structure comprising the surface base material and the adhesive layer preferably has a haze value of not more than 5.0%.

According to the present invention, there is also provided a film laminate which comprises a surface-modified polyolefin film carrying an anchor layer on one side thereof, an adhesive layer for vapor depositing a metal applied onto the side of the polyolefin film opposite to the anchor layer-carrying side and a vapor-deposited metal layer containing a blocking-inhibitory agent on the adhesive layer. In this regard, the laminate preferably has an adhesive layer such as that discussed above on the vapor-deposited metal layer.

As such an adhesive layer (an adhesive layer for a vapor-deposited metal layer) for improving the adhesion of the film to the vapor-deposited metal layer, it is sufficient to use a layer obtained by applying a resin (compound), which permits the improvement of the adhesion of the vapor-deposited metal layer. More specifically, preferably used herein are an acrylic polyol and a vinyl chloride-vinyl acetate copolymer; an ethyleneimine polymer and polyethyleneimine-containing methacrylic acid ester compound; and nitrocellulose and acrylic polyol resin. Such an adhesive layer may preferably be used herein because of its excellent adhesion and water resistance. In this regard, auxiliary agents such as a curing agent and a UV absorber may be added to the adhesive layer for vapor deposition. In particular, it is preferred to promote crosslinking through the addition of an isocyanate compound to acrylic polyol and vinyl chloride-vinyl acetate copolymer, since the adherence of the resulting adhesive layer is further improved.

In the present invention, when winding up the film on which the foregoing adhesive layer for vapor-deposition (the film is once wound up prior to the vapor-deposition), a blocking-inhibitory agent is in advance incorporated into the adhesive layer for vapor-deposition in order to prevent the occurrence of any blocking due to the contact between the easily printable layer and the adhesive layer for vapor-deposition.

The blocking-inhibitory agent is not restricted to any particular one inasmuch as it can prevent the occurrence of any blocking. However, preferably used herein are organic pigments and inorganic pigments since the addition thereof in only a small amount can inhibit any blocking. The organic and inorganic pigments usable in the present invention are not restricted to particular ones insofar as they never impair the transparency of the resulting film. However, particularly preferred are organic pigments having approximately true spherical shapes (extending from true spherical shapes to spherical shapes close to the true spherical shapes). Particularly preferred examples of such organic pigments include acrylic resins, polystyrene resins, and styrene-acrylic copolymer resins. Among these, polymethacrylate crosslinked products (acrylic resins) are particularly preferred because of their excellent transparency. The relative amount of the pigment (organic pigment) to be incorporated into the adhesive layer for vapor-deposition preferably ranges from 0.1 to 1.0 part by weight and particularly preferably 0.2 to 0.5 part by weight based on 100 parts by weight of the solid contents of the adhesive layer. In addition, the particle size of the organic pigment is not limited to any specific range, but it preferably ranges from 1.0 to 10 $\mu$m.

The adhesive layer for metal vapor-deposition may be formed by diluting the foregoing components with a solvent such as toluene, ethyl acetate, IPA or MEK to a desired extent and then applying the resulting dispersion onto the film by any known coating method. Examples of such known coating method include a metering bar coating, gravure roll coating, air knife coating, spray coating or reverse roll coating method.

The thickness of the adhesive layer for metal vapor-deposition is not restricted to any particular range inasmuch as it can ensure satisfactory adhesion of the layer to the metal vapor-deposited layer. However, if the thickness is too high, the production cost increases and the resulting product would be liable to cause blocking. Therefore, the adhesive layer is desirably formed in a thickness of not more than about 3.0 $\mu$m and preferably not more than about 1.5 $\mu$m. In this connection, it is also possible to simultaneously form the easily printable layer and the adhesive layer for metal vapor-deposition by applying ingredients for these layers at the same time.

Alternatively, such an adhesive layer for vapor-deposition may likewise be prepared by coating a resin for improving adhesiveness on the easily adherent film after longitudinal orientation of the film and then subjecting the film to lateral orientation. Such a method is quite preferred since it permits the formation of an adhesive layer having high transparency. More specifically, a polyolefin composition is melt-extruded according to the usual method and then the extruded polyolefin composition is first longitudinally stretched to give a film uniaxially oriented in the longitudinal direction. At this stage, either or both sides of the resulting longitudinally uniaxially oriented film may be subjected to a corona discharge treatment and/or a flame treatment for the improvement of the wet tension of the face(s). Thereafter, a blocking-inhibitory agent-containing adhesive layer for vapor-deposition is applied onto the face. The coated layer is sufficiently dried prior to the lateral orientation. In this respect, the resin coated layer on the film obtained after the lateral orientation may further be subjected to a corona discharge treatment. The resin to be applied is preferably an ethylene-acrylic acid type copolymer and the latter is used in the form of an aqueous dispersion or solution.

In addition, a coating liquid can be applied onto the both sides of the film after the longitudinal orientation, followed by drying and lateral orientation. Thus, the resin films formed on the both sides of the film can serve as an anchor layer for easy printing on the one side and an adhesive layer for vapor-deposition on the other side.

The haze value of the film prior to the vapor-deposition of a metal is preferably not more than 5% and more preferably not more than 3%.

In this connection, it is also possible to impart a color tone, which cannot be achieved by simple vapor-deposition of a metal by incorporating a coloring agent (such as a dye) into at least one layer selected from the film base material, the adhesive layer for vapor-deposition and the easily printable layer.

As methods for depositing a metal on the adhesive layer for vapor-deposition in vacuo, the vacuum deposition technique usually employed can be used without any modification. Examples of metals usable in the present invention are aluminum, gold, silver, copper, chromium, tin, indium, antimony, and nickel, with aluminum being most generally used. For instance, it is sufficient to vapor-deposit, with heating, a metal onto one side of a base film material in a container which is evacuated to a high vacuum. The depositing method may be a small-sized batchwise method and a continuous method in which a metal is vapor-deposited on a film wound into a roll-like shape. The thickness of the aluminum thus deposited in general ranges from 20 A to 1000 A and preferably not more than 500 A.

In the present invention, an adhesive layer and a release sheet can be laminated with the vapor-deposited film on the side on which the metal has been vapor-deposited. Alternatively, it is also possible to first form a resin layer for protecting the vapor-deposited layer on the surface thereof and to then laminate the resin layer with an adhesive layer.

The present invention also provides the foregoing film laminate in which the surface-modified polyolefin film is a surface-roughened polyolefin sheet and a metal vapor-deposited layer is formed on the side of the sheet opposite to the anchor layer-carrying side of the sheet. In this case, the foregoing adhesive layer is preferably applied onto the metal vapor-deposited layer.

A polyolefin film such as a polypropylene film can in general be surface-roughened by, for instance, the following methods: (1) A method comprises for embossing a film, (2) A method comprises the step of spraying fine particles such as sand particles to the surface of a film to thus form small defects on the film surface (sand-matting method), and (3) A method comprises the step of forming unevenness on the film surface through coating.

Examples of other surface-roughening treatments of the polyolefin film include the following methods: (4) A method comprises the steps of laminating a polypropylene resin film with a resin composition containing an ethylene-propylene block copolymer and then orienting the resulting laminate, (5) A method comprises the steps of laminating a polypropylene film with a resin composition blended with a polyethylene and then orienting the resulting laminate, and (6) A method comprises the steps of preparing a sheet by extruding a mixture of polypropylenes different in crystallizability and then stretching the resulting sheet.

In the present invention, a method in which a resin is laminated with a polyolefin film and then oriented, like the latter method (such as the foregoing method (4), (5) or (6)) are particularly preferred. This is because, the film can be surface-roughened during production of the film and therefore, the method does not require the use of other steps such as embossing and sand matting. Moreover, the method also permits the formation of a roughened surface having excellent matting properties. The method (5) is particularly preferred among others. This is because the incorporation of polyethylene would greatly enhance the adhesion of the metal vapor-deposited layer to the polyolefin film. In addition, if the both sides of the polyolefin film are surface-roughened, the resulting product has further improved matting properties as compared with the product, only one side of which is surface-roughened.

An adhesive layer for vapor-deposition may be formed to improve the adhesion between the film and the metal vapor-deposited layer (for instance, deposited aluminum layer). Preferably used herein as such an adhesive layer for vapor-deposition are those described above. The adhesive layer may be applied to a roughened surface or a smooth surface. In this connection, the smooth surface is insufficient in particular in the adhesion to the metal vapor-deposited layer and thus an adhesive layer is preferably used. The adhesive layer may be one obtained by coating a resin (compound), which allows the improvement of the adhesion the film to the vapor-deposited metal layer. The thickness of the adhesive layer thus applied should preferably be not more than 1.5 μm. This is because if the application of such a resin in an excess amount may result in an increase of the production cost and the occurrence of blocking phenomenon. Alternatively, when an adhesive layer is applied onto a roughened surface, the thickness of the adhesive layer is preferably not more than 1.5 μm.

The present invention will hereunder be described in more detail with reference to the following working Examples, but the present invention is not restricted to these specific Examples at all. In each Example given below, "%" means "% by weight".

EXAMPLE 1

In this Example, there was used a polypropylene containing 300 ppm of a pigment (zeolite), and having [η] as determined in tetralin maintained at 135° C. of 2.4 and an isotactic index of the residue after the extraction with boiling n-pentane of 97%. The polypropylene was fed to an extruder having a bore diameter of 50 mm φ, extruded through a T-shaped die at 290° C., followed by cooling down to 40° C. to give a sheet free of any orientation and having a thickness of 1600 μm and a width of 270 mm. The resulting sheet was longitudinally oriented to a length of 5 times the initial length of the sheet. Then one side of the longitudinally oriented film was subjected to a corona discharge treatment according to the spark-gap method (a corona discharge treating device available from Tomoe Industry Co., Ltd.; processing electric power=1.2 KW). Thus, a longitudinally oriented polypropylene film was prepared and the wet tension of the corona discharge-treated side was found to be 40 dyne/cm.

A surface-modifying layer 1 mainly comprising an aqueous dispersion of an ethylene-acrylic acid type copolymer (concentration=15%) was printed on the resulting film by the gravure printing method. Then the printed layer 1 was dried and subsequently the film was laterally oriented to a size of 8 times the original one. After the lateral orientation, the highly transparent and easily adherent layer (the printed layer was subjected to a corona discharge treatment till the wet tension thereof reached 46 dyne/cm. The final thickness of the film was found to be 50 μm. Moreover, the amount of the surface-modifying layer printed after the lateral orientation was found to be 0.1 g/m².

A paint for forming an anchor layer 1 having the composition specified below (concentration 6%; solvent: water/IPA) was coated on the surface-modified polypropylene film in a coated amount of 0.3 g/m² and then dried to give a highly transparent and easily adherent film.

| [Surface Modifying Layer 1] | |
|---|---|
| Ethylene-acrylic acid-maleic anhydride copolymer (Trade name: Sepolsion M220E, available from Sumitomo Seika Chemicals Co., Ltd.) | 99.5% by weight |
| Silica (Trade name: Sailisia 310, available from Fuji Silysia Co., Ltd.) | 0.5% by weight |
| [Anchor Layer 1] | |
| Oxazoline group-modified resin (Trade name: Epocross WS-500, available from Nippon Shokubai Kagaku Kogyo Co., Ltd.) | 2% by weight |
| Acrylic resin (Trade name: AC-2235, available from Rohm & Haas Company) | 98% by weight |

EXAMPLE 2

The same procedures and experiments used and performed in Example 1 were repeated except that the content of a pigment (silica) present in the polypropylene was set at 1000 ppm, that a surface-modifying layer 2 (concentration 15%) was substituted for the surface-modifying layer and that an anchor layer 2 (concentration 3%) was substituted for the anchor layer used in Example 1 and the coated amount thereof was changed to 0.1 g/m².

[Surface-Modifying Layer 2]

| | |
|---|---|
| Ethylene-(meth)acrylate-(meth)acrylic acid salt copolymer (Trade name: Chemipal S300, available from Mitsui Chemical Co., Ltd.) | 98% by weight |
| Silica (Trade name: Sailisia 310, available from Fuji Silysia Co., Ltd.) | 2% by weight |

[Anchor Layer 2]

| | |
|---|---|
| Oxazoline group-modified resin (Trade name: Epocross WS-500, available from Nippon Shokubai Kagaku Kogyo Co., Ltd.) | 9% by weight |
| Acrylic resin (Trade name: EK-72, available from Saiden Chemical Co., Ltd.) | 89.5% by weight |
| Plastic pigment (Trade name: Epostar MA1002, available from Nippon Shokubai Kagaku Kogyo Co., Ltd.) | 1.5% by weight |

EXAMPLE 3

The same procedures and experiments used and performed in Example 1 were repeated except that the content of a pigment (silica) present in the polypropylene was set at 2000 ppm, that a surface-modifying layer 3 (concentration 12%) was substituted for the surface-modifying layer and that an anchor layer 3 (concentration 1%) was substituted for the anchor layer used in Example 1 and the coated amount thereof was changed to 0.07 g/m².

[Surface-Modifying Layer 3]

| | |
|---|---|
| Ethylene-(meth)acrylate-(meth)acrylic acid copolymer (Trade name: Sepolsion V411P, available from Sumitomo Seika Chemicals Co., Ltd.) | 99.5% by weight |
| Silica (Trade name: Sailisia 310, available from Fuji Silysia Co., Ltd.) | 0.5% by weight |

[Anchor Layer 3]

| | |
|---|---|
| Oxazoline group-modified resin (Trade name: Epocross WS-500, available from Nippon Shokubai Kagaku Kogyo Co., Ltd.) | 25% by weight |
| SBR resin (Trade name: 0850, available from Nippon Synthetic Rubber Co., Ltd. | 75% by weight |

EXAMPLE 4

The same procedures and experiments used in Example 1 were repeated except that the content of a pigment (silica) present in the polypropylene was set at 0 ppm, that a surface-modifying layer 4 (concentration 15%) was substituted for the surface-modifying layer, that an anchor layer 4 (concentration 3%) was substituted for the anchor layer used in Example 1 and that the coated amount thereof was changed to 0.9 g/m².

[Surface-Modifying Layer 4]

| | |
|---|---|
| Ethylene-(meth)acrylate-(meth)acrylic acid salt copolymer (Trade name: Chemipal S650, available from Mitsui Chemical Co., Ltd.) | 95% by weight |
| Silica (Trade name: Sailisia 310, available from Fuji Silysia Co., Ltd.) | 5% by weight |

[Anchor Layer 4]

| | |
|---|---|
| Oxazoline group-modified resin (Trade name: Epocross K-1030E, available from Nippon Shokubai Kagaku Kogyo Co., Ltd.) | 45% by weight |
| Polyester Resin (Trade name: A515G, available from Takamatsu Fats & Oils Co., Ltd.) | 52% by weight |
| Plastic pigment (Trade name: Epostar MA1001, available from Nippon Shokubai Kagaku Kogyo Co., Ltd.) | 3% by weight |

EXAMPLE 5

The same procedures and experiments used in Example 1 were repeated except that the content of a pigment (silica) present in the polypropylene was set at 250 ppm, that a surface-modifying layer 5 (concentration 13%) was substituted for the surface-modifying layer, that an anchor layer 5 (concentration 2%) was substituted for the anchor layer used in Example 1 and that the coated amount thereof was changed to 0.1 g/m².

[Surface-Modifying Layer 5]

| | |
|---|---|
| Ethylene-glycidyl (meth)acrylate copolymer (Trade name: Sepolsion G118, available from Sumitomo Seika Chemicals Co., Ltd.) | 98% by weight |
| Silica (Trade name: Sailisia 310, available from Fuji Silysia Co., Ltd. | 2% by weight |

[Anchor Layer 5]

| | |
|---|---|
| Oxazoline group-modified resin (Trade name: Epocross WS-500, available from Nippon Shokubai Kagaku Kogyo Co., Ltd.) | 10% by weight |
| Polyester Resin (Trade name: A515G, available from Takamatsu Fats & Oils Co., Ltd.) | 90% by weight |

Comparative Example 1

The same procedures and experiments used in Example 1 were repeated except that the content of a pigment (zeolite) present in the polypropylene was changed to 10000 ppm and that any surface-modifying layer was not used.

Comparative Example 2

The same procedures and experiments used in Example 1 were repeated except that the content of a pigment (zeolite) present in the polypropylene was set at 250 ppm, that a surface-modifying layer 6 (concentration 13%) was substituted for the surface-modifying layer, that an anchor layer 6 (concentration 2%) was substituted for the anchor layer used in Example 1 and that the coated amount thereof was changed to 0.1 g/m².

[Surface-Modifying Layer 6]

| | |
|---|---|
| Ethylene-acrylic acid-maleic anhydride copolymer (Trade name: Sepolsion M220E, available from Sumitomo Seika Chemicals Co., Ltd.) | 100% by weight |

[Anchor Layer 6]

| | |
|---|---|
| Acrylic resin (Trade name: AC-2235, available from Rohm & Haas Company) | 100% by weight |

The following characteristic properties for the highly transparent easily adhesive films of the foregoing Examples 1 to 5 and Comparative Examples 1 to 2 were evaluated. The results thus obtained are summarized in the following Table 1:

Characteristic Properties Evaluated
(Transparency)

The resulting highly transparent and easily adherent film was inspected for the haze value according to JIS-K-7105 to thus evaluate the transparency of the film.
(Blocking Resistance)

The resulting highly transparent and easily adherent film was cut into pieces of 5 cm square each, then 10 pieces were put in layers, an weight of 5 kg was loaded on the pieces put in layers and allowed to stand in an environment maintained at 40° C. and 70% RH over 24 hours to examine the presence of any blocking.

◯: There was not observed any blocking.

×: There was observed blocking.
(Adhesion of Anchor Layer to the Film)

A piece of cellophane tape (available from Oji Tac Co., Ltd.) was adhered to the resulting highly transparent and easily adherent film and then removed therefrom to thus evaluate the adhesion of the anchor layer.

◯: There was not observed any removal of the anchor layer.

×: The anchor layer was peeled off.
(Adhesion of UV Flexo-Ink to the Film)

The resulting highly transparent and easily adherent film was printed with a UV flexo-ink (White H [T & K available from TOKA Company]) to a thickness of $10\mu$. Then the adhesion of the film to the ink was evaluated by making a cut in a pattern of checkers, adhering a piece of cellophane tape to the film on the ink-printed side and then removing the cellophane tape.

◯: There was not observed any peeling of the ink layer.

×: The ink layer was peeled off.
(Adhesion of Gravure Ink to the Film)

The resulting highly transparent and easily adherent film was printed with a dilute solution (GN-502 available from Dainippon Ink and Chemicals, Inc.) of a gravure ink (GNC ST39 Indigo Blue, available from Dainippon Ink and Chemicals, Inc.) at a gravure mesh of 200 lines. Then a piece of cellophane tape (available from Oji Tac Co., Ltd.) was adhered to the film on the ink-supporting side and then removed therefrom to evaluate the adhesion of the ink thereto.

◯: There was not observed any peeling of the ink layer.

×: The ink layer was peeled off.
(Adhesion of Thermal Transfer Ink to the Film)

Letters were printed on the resulting highly transparent and easily adherent film with KMP-8104 (available from KS Systems Company) according to the melt thermal transfer technique. Subsequently, the adhesion of the printed letters to the film was evaluated by adhering a piece of cellophane tape (available from Oji Tac Co., Ltd.) to the film on the letter-printed portion and then removing the tape.

◯: There was not observed any peeling of the ink layer.

×: The ink layer was peeled off.
(Adhesion of Coated Layer to the Film)

An ink jet recording layer, a heat-sensitive recording layer, a melt thermal transfer recording layer or a sublimation heat transfer recording layer was applied onto the resulting highly transparent and easily adherent film to give each corresponding recording paper. Then the adhesion of each coated film to the film was evaluated by pasting a piece of cellophane tape (available from Oji Tac Co., Ltd.) to the coated film and then removing the tape.

◯: There was not observed any peeling of the coated layer.

×: The coated layer was peeled off.

[Ink Jet Recording Layer]:
Paint concentration 15%; Coated amount 15 g/m²

| | |
|---|---|
| PVA (Trade name: PVA117 available from Kuraray Co., Ltd.): | 20% by weight |
| Silica (Trade name: Sailisia 310, available from Fuji Silysia Co., Ltd.) | 80% by weight |

[Heat-Sensitive Recording Layer]:
Paint concentration 40%; Coated amount 7 g/m²

| | |
|---|---|
| Leuco dye (Trade name: S205, available from Hodogaya Chemical Co., Ltd.) | 10% by weight |
| Developer (bisphenol A) | 20% by weight |
| Sensitizer (Trade name: HS3520, available from Dainippon Ink & Chemicals, Inc.) | 20% by weight |
| Wax (Trade name: Z-7-30, available from Chukyo Fats & Oils Co., Ltd.) | 5% by weight |
| Pigment (Trade name: Brilliant 15, available from Shiraishi Industries, Ltd.) | 30% by weight |
| SBR (Trade name: 0619, available from Nippon Synthetic Rubber Co., Ltd.) | 15% by weight |

[Melt Thermal Transfer Recording Layer]:
Paint concentration 30%; Coated amount 15 g/m²

| | |
|---|---|
| Pigment (Trade name: Brilliant 15, available from Shiraishi Industries, Ltd.) | 83% by weight |
| PVA (Trade name: PVA117 available from Kuraray Co., Ltd.) | 15% by weight |
| SBR (Trade name: 0619, available from Nippon Synthetic Rubber Co., Ltd.) | 2% by weight |

[Sublimation Heat Transfer Recording Layer]:
Paint concentration 25%; Coated amount 8 g/m²

| | |
|---|---|
| Polyester (Trade name: Bairon 200, available from Toyobo Co., Ltd.) | 94% by weight |
| Silicone oil (Trade name: KF393, available from Shin-Etsu Silicon Co., Ltd.) | 2% by weight |
| Isocyanate (Trade name: Takenate D-140N, available from Takeda Chemical Industries, Ltd.) | 4% by weight |

TABLE 1

| Ex. No. | 1 | 2 | 3 | 4 | 5 | 1* | 2* |
|---|---|---|---|---|---|---|---|
| Haze value (%) | 2.7 | 2.9 | 2.9 | 2.0 | 2.3 | 7.7 | 2.4 |
| Blocking | ◯ | ◯ | ◯ | ◯ | ◯ | ◯ | X |
| Adhesion of Anchor Layer | ◯ | ◯ | ◯ | ◯ | ◯ | X | X |
| Adhesion of UV Flexo Ink | ◯ | ◯ | ◯ | ◯ | ◯ | X | X |
| Adhesion of Gravure Ink | ◯ | ◯ | ◯ | ◯ | ◯ | X | X |
| Adhesion of Melt Thermal Transfer Ink | ◯ | ◯ | ◯ | ◯ | ◯ | X | X |
| Adhesion of Ink Jet Recording Layer | ◯ | ◯ | ◯ | ◯ | ◯ | X | X |
| Adhesion of Heat-Sensitive Recording Layer | ◯ | ◯ | ◯ | ◯ | ◯ | X | X |
| Adhesion of Melt Thermal Transfer Recording Layer | ◯ | ◯ | ◯ | ◯ | ◯ | X | X |
| Adhesion of Sublimation Heat Transfer Recording Layer | ◯ | ◯ | ◯ | ◯ | ◯ | X | X |

*Comparative Example

EXAMPLE 6

(Preparation of Base Film)

In this Example, there was used a polypropylene containing 300 ppm of a pigment (zeolite), and having [η] as determined in tetralin maintained at 135° C. of 2.4 and an isotactic index of the residue after the extraction with boiling n-pentane of 97%. The polypropylene was fed to an extruder having a bore diameter of 50 mm φ, extruded through a T-shaped die at 290° C., followed by cooling down to 40° C. to give a sheet free of any orientation and having a thickness of 1600 μm and a width of 270 mm. The resulting sheet was longitudinally oriented to a length of 5 times the initial length of the sheet. Then one side of the longitudinally oriented film was subjected to a corona discharge treatment according to the spark-gap method (a corona discharge treating device available from Tomoe Industry Co., Ltd.; processing electric power=1.2 KW). Thus, a longitudinally oriented polypropylene film was prepared and the wet tension of the corona discharge-treated side was found to be 40 dyne/cm.

A surface-modifying layer mainly comprising an aqueous dispersion of an ethylene-acrylic acid type copolymer (concentration=15%) was printed on the resulting film by the gravure printing method. Then the printed layer was dried and subsequently the film was laterally oriented to a size of 8 times the original one. After the lateral orientation, the highly transparent and easily adherent layer (the printed layer) was subjected to a corona discharge treatment till the wet tension thereof reached 46 dyne/cm. The final thickness of the film was found to be 50 μm. Moreover, the amount of the surface-modifying layer printed after the lateral orientation was found to be 0.1 g/m².

[Surface-Modifying Layer]

| | |
|---|---|
| Ethylene-acrylic acid-maleic anhydride copolymer (Trade name: Sepolsion M220E, available from Sumitomo Seika Chemicals Co., Ltd.) | 99.5% by weight |
| Silica (Trade name: Sailisia 310, available from Fuji Silysia Co., Ltd.) | 0.5% by weight |

(Preparation of Surface Base Material)

The film prepared according to the foregoing method was used as a base film. Then a paint specified below as "Anchor Layer" was applied onto one side of the film in an amount of 0.15 g/m² according to the gravure coating method to form an anchor layer and to thus give a surface base material.

[Anchor Layer]

| | |
|---|---|
| Oxazoline group-modified resin (Trade name: Epocross WS-500, available from Nippon Shokubai Kagaku Kogyo Co., Ltd.) | 5% by weight |
| Acrylic resin (Trade name: AC-2235, available from Rohm & Haas Company) | 95% by weight |

(Preparation of Adhesive-Coating Liquid)

To 100 parts by weight of an acrylic adhesive (Trade name: "OPT-1", available from Saiden Chemical Co., Ltd.), there was added 2 parts by weight of a metal chelate crosslinking agent (Trade name: "M-2", available from Saiden Chemical Co., Ltd.). Then they were mixed together to give an adhesive-coating liquid.

(Preparation of Adhesive Sheet)

The foregoing adhesive-coating liquid was applied onto a commercially available polyethylene terephthalate separator (Trade name: "Cerapeel BK#25", available from Toyo Metallizing Co., Ltd.) in an amount of 20 g/m² as expressed in terms of its dry weight using a comma coater. After the coated liquid was dried at 90° C. for one minute, the foregoing surface base material was pasted with the resulting adhesive layer so that the side of the former free of any anchor layer faced the adhesive layer to give an adhesive sheet.

EXAMPLE 7

The same procedures used in Example 6 were repeated except that the following paint was substituted for the coating liquid for the anchor layer to give an adhesive sheet.

[Anchor Layer]

| | |
|---|---|
| Oxazoline group-modified resin (Trade name: Epocross WS-500, available from Nippon Shokubai Kagaku Kogyo Co., Ltd.) | 20% by weight |
| Polyester Resin (Trade name: A515G, available from Takamatsu Fats & Oils Co., Ltd.) | 78% by weight |
| Plastic pigment (Trade name: Epostar MA1001, available from Nippon Shokubai Kagaku Kogyo Co., Ltd.) | 2% by weight |

EXAMPLE 8

The same procedures used in Example 6 were repeated except that the following coating liquids were substituted for the liquids for the surface-modifying layer and the anchor layer of the base film used in Example 6, to thus give an adhesive sheet.

[Surface-Modifying Layer]

| | |
|---|---|
| Ethylene-(meth)acrylate-(meth)acrylic acid salt copolymer (Trade name: Chemipal S300, available from Mitsui Chemical Co., Ltd.) | 98% by weight |
| Silica (Trade name: Sailisia 310, available from Fuji Silysia Co., Ltd.) | 2% by weight |

[Anchor Layer]

| | |
|---|---|
| Oxazoline group-modified resin (Trade name: Epocross WS-500, available from Nippon Shokubai Kagaku Kogyo Co., Ltd.) | 9% by weight |
| Acrylic resin (Trade name: EK-72, available from Saiden Chemical Co., Ltd.) | 89.5% by weight |
| Plastic pigment (Trade name: Epostar MA1002, available from Nippon Shokubai Kagaku Kogyo Co., Ltd.) | 1.5% by weight |

EXAMPLE 9

The same procedures used in Example 6 were repeated except that an emulsion-polymerized acrylic adhesive (Trade name: "TS-1873", available from Nippon Carbide Industry Co., Ltd.) was substituted for the adhesive used in Example 6 to give an adhesive sheet.

Comparative Example 3

The same procedures used in Example 6 were repeated except that a biaxially oriented polypropylene film (Trade name: "PY-201", available from Oji Paper Co., Ltd.; thickness: 50 μm) was substituted for the surface base material used in Example 6 to give an adhesive sheet.

Comparative Example 4

The same procedures used in Example 6 were repeated except that the following paint was substituted for the coating liquid for the anchor layer used in Example 6 to give an adhesive sheet.

[Anchor Layer]

| | |
|---|---|
| Polyester Resin (Trade name: A515G, available from Takamatsu Fats & Oils Co., Ltd.) | 94% by weight |
| Plastic pigment (Trade name: Epostar MA1004, available from Nippon Shokubai Kagaku Kogyo Co., Ltd.) | 6% by weight |

The adhesive sheets thus prepared were inspected for the following characteristic properties. The results thus obtained are listed in the following Table 2.

(Adhesion of UV Relief Printing Ink to the Sheet)

Each resulting adhesive sheet was printed with a UV relief printing ink (ink used: BESTCURE UV-161 SUMI, available from T & A TOKA Company) using a seal printing machine: OPM-W150-3S available from ONDA Manufacturing Co., Ltd. Then a piece of cellophane tape (available from Oji Tac Co., Ltd.) was adhered to the printed ink layer and thereafter peeled off from the same to thus determine the adhesion of the ink to the sheet.

◯: There was not observed any removal of the ink layer.
×: The ink layer was peeled off.

(Adhesion of UV Flexo-Ink to the Sheet)

Each resulting sheet was printed with a UV flexo-ink (White H [T & K available from TOKA Company]) to a thickness of 10μ. Then the adhesion of the sheet to the ink was evaluated by making a cut in a pattern of checkers, adhering a piece of cellophane tape to the film on the ink-printed side and then removing the cellophane tape.

◯: There was not observed any peeling of the ink layer.
×: The ink layer was peeled off.

(Transparency)

The resulting highly transparent and easily adherent film was inspected for the haze value according to JIS-K-7105 to thus evaluate the transparency of the film.

TABLE 2

| Ex. No. | Haze (%) | Adhesion of UV Relief Printing Ink to the Sheet | Adhesion of UV Flexo-Ink to the Sheet |
|---|---|---|---|
| 6 | 3.3 | ◯ | ◯ |
| 7 | 3.6 | ◯ | ◯ |
| 8 | 3.5 | ◯ | ◯ |
| 9 | 3.9 | ◯ | ◯ |
| 3* | 2.8 | × | × |
| 4* | 5.5 | ◯ | × |

*: Comparative Example

EXAMPLE 10

(Preparation of Base Film)

In this Example, there was used a polypropylene containing 300 ppm of a pigment (zeolite), and having [η] as determined in tetralin maintained at 135° C. of 2.4 and an isotactic index of the residue after the extraction with boiling n-pentane of 97%. The polypropylene was fed to an extruder having a bore diameter of 50 mm φ, extruded through a T-shaped die at 290° C., followed by cooling down to 40° C. to give a sheet free of any orientation and having a thickness of 1600 μm and a width of 270 mm. The resulting sheet was longitudinally oriented to a length of 5 times the initial length of the sheet. Then one side of the longitudinally oriented film was subjected to a corona discharge treatment according to the spark-gap method (a corona discharge treating device available from Tomoe Industry Co., Ltd.; processing electric power=1.2 KW). Thus, a longitudinally oriented polypropylene film was prepared and the wet tension of the corona discharge-treated side was found to be 40 dyne/cm.

A surface-modifying layer mainly comprising an aqueous dispersion of an ethylene-acrylic acid type copolymer (concentration=15%) was printed on the resulting film by the gravure printing method. Then the printed layer was dried and subsequently the film was laterally oriented to a size of 8 times the original one. After the lateral orientation, the highly transparent and easily adherent layer (the printed layer) was subjected to a corona discharge treatment till the wet tension thereof reached 46 dyne/cm. The final thickness of the film was found to be 50 μm. Moreover, the amount of the surface-modifying layer printed after the lateral orientation was found to be 0.1 g/m².

The film prepared according to the foregoing method was used as a base film. Then a paint specified below as "Anchor Layer" was applied onto one side of the film in an amount of 0.15 g/m² according to the gravure coating method to form an anchor layer and to thus give a surface base material.

[Surface-Modifying Layer]

| | |
|---|---|
| Ethylene-acrylic acid-maleic anhydride copolymer (Trade name: Sepolsion M220E, available from Sumitomo Seika Chemicals Co., Ltd.) | 99% by weight |
| Silica (Trade name: Sailisia 310, available from Fuji Silysia Co., Ltd.) | 1% by weight |

[Anchor Layer]

| | |
|---|---|
| Oxazoline group-modified resin (Trade name: Epocross WS-500, available from Nippon Shokubai Kagaku Kogyo Co., Ltd.) | 15% by weight |
| Polyester Resin (Trade name: A515G, available from Takamatsu Fats & Oils Co., Ltd.) | 85% by weight |

(Preparation of Metal Vapor-Deposited Film)

After diluting the following coating liquid with toluene/ethyl acetate, the diluted liquid was coated on the side of the base film opposite to that carrying the anchor layer to a thickness of 0.7 μm to thus give an adhesive layer for vapor-deposition. Then aluminum was deposited on the adhesive layer for vapor-deposition to a thickness of 200 to 500A to give a metal-deposited film.

[Adhesive Layer for Vapor-Deposition]

| | |
|---|---|
| Aminoethyl-modified resin (Trade name: NK-350, available from Nippon Shokubai Kagaku Kogyo Co., Ltd.) | 99.5% by weight |
| Plastic pigment (Trade name: Epostar MA1002, available from Nippon Shokubai Kagaku Kogyo Co., Ltd.) | 0.5% by weight |

(Preparation of Adhesive Sheet)

To 100 parts by weight of an acrylic adhesive (Trade name: "OP-1" available from Toyo Ink Mfg. Co., Ltd.), there was added 2 parts by weight of an isocyanate crosslinking agent (Trade name: "BXX-5627", available from Toyo Ink Mfg. Co., Ltd.). Then they were admixed together to give an adhesive-coating liquid.

The foregoing adhesive-coating liquid was applied onto a commercially available polyethylene terephthalate separator (Trade name: "Cerapeel BK#25", available from Toyo Metallizing Co., Ltd.) in an amount of 20 g/m² as expressed in terms of its dry weight using a comma coater. After the coated liquid was dried at 90° C. for one minute, the foregoing metal vapor-deposited film was pasted with the resulting adhesive layer to give an adhesive sheet.

EXAMPLE 11

The same procedures used in Example 10 were repeated except that the following coating liquids were substituted for those for the surface-modifying layer of the base film and the anchor layer of the surface base material to give an adhesive sheet.

| [Surface-Modifying Layer] | |
|---|---|
| Ethylene-(meth)acrylate-(meth)acrylic acid salt copolymer (Trade name: Chemipal S300, available from Mitsui Chemical Co., Ltd.) | 98% by weight |
| Silica (Trade name: Sailisia 310, available from Fuji Silysia Co., Ltd.) | 2% by weight |
| [Anchor Layer] | |
| Oxazoline group-modified resin (Trade name: Epocross WS-500, available from Nippon Shokubai Kagaku Kogyo Co., Ltd.) | 9% by weight |
| Acrylic resin (Trade name: EK-72, available from Saiden Chemical Co., Ltd.) | 89.5% by weight |
| Plastic pigment (Trade name: Epostar MA1002, available from Nippon Shokubai Kagaku Kogyo Co., Ltd.) | 1.5% by weight |

EXAMPLE 12

The same procedures used in Example 10 were repeated except that the following coating liquid was substituted for the adhesive layer for vapor-deposition used in Example 10 to give an adhesive sheet.

| [Adhesive Layer for Vapor-Deposition] | |
|---|---|
| Acrylic polyol-vinyl chloride-vinyl acetate copolymer resin (Trade name: "VMD Medium" available from Dainichiseika Co. Ltd.) | 89.7% by weight |
| Isocyanate compound (Trade name: "VMD Curing Agent", available from Dainichiseika Co. Ltd.) | 10% by weight |
| Plastic pigment (Trade name: Epostar MA1002, available from Nippon Shokubai Kagaku Kogyo Co., Ltd.) | 0.3% by weight |

EXAMPLE 13

The same procedures used in Example 10 were repeated except for using an emulsion type acrylic adhesive (L-145A, available from Nippon Carbide Industries Co., Ltd.) to give an adhesive sheet.

Comparative Example 5

The same procedures used in Example 10 were repeated except that the following film was substituted for the metal vapor-deposited film used in Example 10 to give an adhesive sheet.
(Preparation of Metal Vapor-Deposited Film)
Aluminum was deposited on one side of a biaxially oriented polyolefin film (Trade name: "PY-201", available from Oji Paper Co., Ltd.; thickness 50 μm) through the vapor-deposition technique to a thickness ranging from 200 to 500 A to thus give a metal vapor-deposited film.

Comparative Example 6

The same procedures used in Example 10 were repeated except for omitting the adhesive layer for vapor-deposition to thus give an adhesive sheet.

Comparative Example 7

The same procedures used in Example 10 were repeated except for omitting the use of any plastic pigment to thus give an adhesive sheet.

Each adhesive sheet thus prepared was inspected for the following characteristic properties. The results thus obtained are summarized in the following Table 3.

Characteristic Properties Evaluated
(Adhesion of Metal Vapor-Deposited Layer to the Film)
Each resulting adhesive sheet was adhered to a heat-resistant glass plate having a thickness of 5 mm, followed by immersing the assembly in warmed water of 40° C. over 48 hours. Then the assembly was removed from the warmed water, pasting a piece of adhesive tape (available from Oji Tac Co., Ltd.) having a length of about 150 mm to the adhesive sheet. Then the adhesive tape was removed from the assembly to evaluate the adhesion of the vapor-deposited layer to the sheet.
○: The aluminum vapor-deposited layer was not peeled off at all.
×: The aluminum vapor-deposited layer was peeled off.
(Adhesion of UV Relief Printing Ink to the Sheet)
Each resulting adhesive sheet was printed with a UV relief printing ink (ink used: BESTCURE UV-161 SUMI, available from T & A TOKA Company) using a seal printing machine: OPM-W150-3S available from ONDA Manufacturing Co., Ltd. Then a piece of cellophane tape (available from Oji Tac Co., Ltd.) was adhered to the printed ink layer and thereafter peeled off from the same to thus determine the adhesion of the ink to the sheet.
○: There was not observed any removal of the ink layer.
×: The ink layer was peeled off.
(Adhesion of UV Flexo-Ink to the Sheet)
Each resulting sheet was printed with a UV flexo-ink (White H [available from T & K TOKA Company]) to a thickness of 10μ. Then the adhesion of the sheet to the ink was evaluated by making a cut in a pattern of checkers, adhering a piece of cellophane tape (available from Oji Tac Co., Ltd.) to the film on the ink-printed side and then removing the cellophane tape.
○: There was not observed any peeling of the ink layer.
×: The ink layer was peeled off.
(Blocking Resistance)
The film prior to the metal vapor-deposition was cut into pieces of 5 cm square each, then 10 pieces were put in layers, an weight of 5 kg was loaded on the pieces put in layers. Then the pieces were allowed to stand in an environment maintained at 40° C. and 70% RH over 24 hours to examine the presence of any blocking.
○: There was not observed any blocking.
×: There was observed blocking.

TABLE 3

| Ex. No. | 10 | 11 | 12 | 13 | 5* | 6* | 7* |
|---|---|---|---|---|---|---|---|
| Adhesion of Al Vapor-Deposited Layer to the Adhesive Sheet | ○ | ○ | ○ | ○ | X | X | ○ |

TABLE 3-continued

| Ex. No. | 10 | 11 | 12 | 13 | 5* | 6* | 7* |
|---|---|---|---|---|---|---|---|
| Adhesion of UV Relief Printing Ink to the Adhesive Sheet | ○ | ○ | ○ | ○ | X | ○ | ○ |
| Adhesion of UV Flexo-Ink to the Adhesive Sheet | ○ | ○ | ○ | ○ | X | ○ | ○ |
| Resistance to Blocking | ○ | ○ | ○ | ○ | ○ | ○ | X |

*Comparative Example

EXAMPLE 14
(Preparation of Metal Vapor-Deposited Layer)

In this Example, there was used an oriented polypropylene film (Trade name: "POW-201", available from Oji Paper Co., Ltd.), both sides of which had been subjected to surface-roughening treatment having a thickness of 50 μm. The polypropylene film was longitudinally oriented. Then the oriented polypropylene film was laminated, on the both sides, with a resin composition mainly comprising a polypropylene, which had been blended with a polyethylene, through extrusion. The resulting laminate was then laterally oriented to give a film, both sides of which had been surface-roughened. Thereafter, the following paint was applied onto the resulting laminate film in a coated amount of 0.15 g/m² as an anchor layer.

[Anchor Layer]

| Oxazoline group-modified resin (Trade name: Epocross WS-500, available from Nippon Shokubai Kagaku Kogyo Co., Ltd.) | 5% by weight |
| Acrylic resin (Trade name: AC-2235, available from Rohm & Haas Company) | 95% by weight |

Then aluminum was vapor-deposited on the side of the polypropylene film opposite to that carrying the anchor layer to a thickness ranging from 200 to 500 Å to thus give a metal vapor-deposited film.

(Preparation of Adhesive Sheet)

To 100 parts by weight of an acrylic adhesive (Trade name: "OP-1", available from Toyo Ink Mfg. Co., Ltd.), there was added 2 parts by weight of an isocyanate crosslinking agent (Trade name: "BXX-5627", available from Toyo Ink Mfg. Co., Ltd.). Then they were admixed together to give an adhesive coating liquid.

The foregoing adhesive coating liquid was applied onto a commercially available polyethylene terephthalate separator (Trade name: "Cerapeel BK#25", available from Toyo Metallizing Co., Ltd.) in an amount of 20 g/m² as expressed in terms of its dry weight using a comma coater. After the coated liquid was dried at 90° C. for one minute, the foregoing metal vapor-deposited film was pasted with the resulting adhesive layer to give an adhesive sheet.

EXAMPLE 15

The same procedures used in Example 14 were repeated except that the following paint was applied onto the surface-roughened side of the film opposite to that carrying the anchor layer in a coated amount of 0.5 g/m² to give an adhesive layer for vapor-deposition. Then aluminum was vapor-deposited on the adhesive layer to a thickness ranging from 200 to 500 Å to give a metal vapor-deposited sheet. Moreover, an adhesive sheet was prepared according to the same method used in Example 14.

[Adhesive Layer for Vapor-Deposition]

| Aminoethyl-modified resin (Trade name: NK-350, available from Nippon Shokubai Kagaku Kogyo Co., Ltd.) | 99.5% by weight |
| Plastic pigment (Trade name: Epostar MA1002, available from Nippon Shokubai Kagaku Kogyo Co., Ltd.) | 0.5% by weight |

Comparative Example 8

The same procedures used in Example 14 were repeated except that any anchor layer was not applied to give a metal vapor-deposited film and an adhesive sheet.

Comparative Example 9

The same procedures used in Example 14 were repeated except that any oxazoline group-modified resin was not incorporated into the paint for the anchor layer to give a metal vapor-deposited film and an adhesive sheet.

EXAMPLE 16

The same procedures used in Example 14 were repeated except that the following paint was applied to form an anchor layer to give a metal vapor-deposited film and an adhesive sheet.

[Anchor Layer]

| Oxazoline group-modified resin (Trade name: Epocross WS-500, available from Nippon Shokubai Kagaku Kogyo Co., Ltd.) | 9% by weight |
| Acrylic resin (Trade name: EK-72, available from Saiden Chemical Co., Ltd.) | 89.5% by weight |
| Plastic pigment (Trade name: Epostar MA1002, available from Nippon Shokubai Kagaku Kogyo Co., Ltd.) | 1.5% by weight |

EXAMPLE 17

In this Example, there was used a biaxially oriented polypropylene film (Trade name: "PO-201", available from Oji Paper Co., Ltd.), one side of which had been surface-roughened, having a thickness of 50 μm. The polypropylene film was longitudinally oriented. Then the oriented film was laminated with, on one side, a composition mainly comprising a polypropylene, which had been blended with a polyethylene, through extrusion. The laminate film was then laterally oriented to give a film, one side of which had been surface-roughened. Thereafter, the same procedures used in Example 14 were repeated except that an anchor layer was applied to the side of the film free of any surface-roughening treatment and that a metal vapor-deposited layer was formed on the surface-roughened side of the film. Thus, there were prepared a metal vapor-deposited film and an adhesive sheet.

EXAMPLE 18

In this Example, there was used a biaxially oriented polypropylene film (Trade name: "PO-201", available from Oji Paper Co., Ltd.), one side of which had been surface-roughened, having a thickness of 50 μm. The polypropylene film was longitudinally oriented. Then the oriented film was laminated with, on one side, a composition mainly comprising a polypropylene, which had been blended with a polyethylene, through extrusion. The laminate film was then laterally oriented to give a film, one side of which had been surface-roughened. Thereafter, the same procedures used in Example 14 were repeated to give a metal vapor-deposited film and an adhesive sheet. In this respect, however, the same anchor layer used in Example 14 was formed on the surface-roughened side of the film. On the other hand, the following paint was applied onto the side of the film free of any surface-roughening treatment in a coated amount of 0.5 g/m$^2$ to give an adhesive layer for vapor-deposition. Moreover, aluminum was deposited on the adhesive layer for vapor-deposition to a thickness ranging from 200 to 500 A.

[Adhesive Layer for Vapor-Deposition]

| | |
|---|---|
| Aminoethyl-modified resin (Trade name: NK-350, available from Nippon Shokubai Kagaku Kogyo Co., Ltd.) | 99.5% by weight |
| Plastic pigment (Trade name: Epostar MA1002, available from Nippon Shokubai Kagaku Kogyo Co., Ltd.) | 0.5% by weight |

Comparative Example 10

The same procedures used in Example 17 were repeated except that any anchor layer was not applied to give a metal vapor-deposited film and an adhesive sheet.

Comparative Example 11

The same procedures used in Example 17 were repeated except that any oxazoline group-modified resin was not incorporated into the coating liquid for the anchor layer to give a metal vapor-deposited film and an adhesive sheet.

Reference Example 1

The same procedures used in Example 18 were repeated except that any adhesive layer for vapor-deposition was not formed to give a metal vapor-deposited film and an adhesive sheet.

EXAMPLE 19

The same procedures used in Example 18 were repeated except for using an emulsion type acrylic adhesive (L-145A, available from Nippon Carbide Industries Co., Ltd.) to give an adhesive sheet according to the present invention.

Each adhesive sheet thus prepared was inspected for the following characteristic properties. The results thus obtained are summarized in the following Table 4.

Characteristic Properties Evaluated
(Adhesion of Metal Vapor-Deposited Layer to the Film)

Each resulting adhesive sheet was adhered to a heat-resistant glass plate having a thickness of 5 mm, followed by immersing the assembly in warmed water of 40° C. over 48 hours. Then the assembly was removed from the warmed water, pasting a piece of adhesive tape (available from Oji Tac Co., Ltd.) having a length of about 150 mm to the adhesive sheet. Then the adhesive tape was removed from the assembly to evaluate the adhesion of the vapor-deposited layer to the sheet.

◯: The aluminum vapor-deposited layer was not peeled off at all.

×: The aluminum vapor-deposited layer was peeled off.

(Adhesion of UV Relief Printing Ink to the Sheet)

Each resulting adhesive sheet was printed with a UV relief printing ink (ink used: BESTCURE UV-161 SUMI, available from T & A TOKA Company) using a seal printing machine: OPM-W150-3S available from ONDA Manufacturing Co., Ltd. Then a piece of cellophane tape (available from Oji Tac Co., Ltd.) was adhered to the printed ink layer and thereafter peeled off from the same to thus determine the adhesion of the ink to the sheet.

◯: There was not observed any removal of the ink layer.

×: The ink layer was peeled off.

(Adhesion of UV Flexo-Ink to the Sheet)

Each resulting sheet was printed with a UV flexo-ink (White H [available from T & K TOKA Company]) to a thickness of 10μ. Then the adhesion of the sheet to the ink was evaluated by making a cut in a pattern of checkers with a cutter knife, adhering a piece of cellophane tape (available from Oji Tac Co., Ltd.) to the film on the ink-printed side and then removing the cellophane tape.

◯: There was not observed any peeling of the ink layer.

×: The ink layer was peeled off.

(Matting Properties)

Each adhesive sheet was inspected for the gloss using a gloss meter to thus evaluate whether the sheet had a luster or not according to the following evaluation standards.

◯: The sheet was good because it had a gloss of not more than 70% and was free of any luster.

Δ: The sheet had a gloss ranging from 70 to 100% and had a slight luster.

×: The sheet was bad since it had a gloss of not less than 100% and a luster.

[Overall Evaluation]

◎: The sheet was quite excellent as a matting adhesive sheet having an ability of printing and metal-like appearance.

◯: The sheet was practically acceptable as a matting adhesive sheet having an ability of printing and metal-like appearance, although it had a slight luster.

×: The sheet was not practically acceptable as a matting adhesive sheet having an ability of printing and metal-like appearance.

TABLE 4

| Ex. No. | 14 | 15 | 16 | 8* | 9* | 17 | 18 | 10* | 11* | 1** | 19 |
|---|---|---|---|---|---|---|---|---|---|---|---|
| Adhesion of Al Vapor-Deposited Layer | ◯ | ◯ | ◯ | ◯ | ◯ | ◯ | ◯ | ◯ | ◯ | × | ◯ |
| Adhesion of UV Relief Printing Ink | ◯ | ◯ | ◯ | × | × | ◯ | ◯ | × | × | ◯ | ◯ |
| Adhesion of UV Flexo-Ink | ◯ | ◯ | ◯ | × | × | ◯ | ◯ | × | × | ◯ | ◯ |

TABLE 4-continued

| Ex. No. | 14 | 15 | 16 | 8* | 9* | 17 | 18 | 10* | 11* | 1** | 19 |
|---|---|---|---|---|---|---|---|---|---|---|---|
| Matting Properties | ○ | △ | ○ | ○ | △ | △ | △ | △ | △ | △ | ○ |
| Overall Evaluation | ◎ | ○ | ◎ | X | X | ○ | ○ | X | X | X | ◎ |

*Comparative Example;
**Reference Example

What is claimed is:

1. A film laminate for printing comprising a polyolefin film, an ethylene-acrylic acid type copolymer resin layer formed on at least one side of the polyolefin film, and an anchor layer formed on the ethylene-acrylic acid type copolymer resin layer, the anchor layer containing an oxazoline group-modified resin.

2. The film laminate as set forth in claim 1 wherein the anchor layer comprises the oxazoline group-modified resin in an amount ranging from 2% by weight to 50% by weight.

3. The film laminate as set forth in claim 1 wherein the anchor layer comprises a binder resin selected from the group consisting of acrylic resins, polyester resins and SBR resins.

4. The film laminate as set forth in claim 1 wherein the amount of the anchor layer ranges from 0.05 to 1 g/m².

5. The film laminate as set forth in claim 1 wherein the polyolefin film is an oriented polyolefin sheet.

6. The film laminate as set forth in claim 1 wherein the ethylene-acrylic acid type copolymer resin layer formed on at least one side of the polyolefin film is one obtained by subjecting the surface of an oriented polyolefin film to a corona discharge treatment and then forming, thereon, the ethylene-acrylic acid type copolymer resin layer.

7. The film laminate as set forth in claim 1 wherein a recording layer is applied onto the anchor layer.

8. The film laminate as set forth in claim 1 wherein an adhesive layer is formed on the surface of the polyolefin film opposite to that carrying the anchor layer.

9. The film laminate as set forth in claim 8 wherein a release sheet is formed on the adhesive layer.

10. The film laminate as set forth in claim 8 wherein the polyolefin film is one obtained by subjecting the surface of an oriented polyolefin film to a corona discharge treatment and then forming, thereon, an ethylene-acrylic acid type copolymer resin layer.

11. The film laminate as set forth in claim 1 wherein an adhesive layer for metal vapor-deposition containing an anti-blocking agent is formed on the surface of the polyolefin film opposite to that carrying the anchor layer and a metal vapor-deposited layer is formed on the adhesive layer.

12. The film laminate as set forth in claim 11 wherein it has an adhesive layer on the metal vapor-deposited layer.

13. The film laminate as set forth in claim 11 wherein the polyolefin film is one obtained by subjecting the surface of an oriented polyolefin film to a corona discharge treatment and then forming, thereon, an ethylene-acrylic acid type copolymer resin layer.

14. The film laminate as set forth in claim 1 wherein the polyolefin film is a polyolefin sheet and a metal vapor-deposited layer is formed on the surface of the sheet opposite to that carrying the anchor layer.

15. The film laminate as set forth in claim 14 wherein the polyolefin sheet is a sheet having a three-layered structure, which comprises polyolefin blend layers, each comprising polypropylene as a main component and a polyethylene, on both sides of a polyolefin sheet, the three-layered sheet being surface-roughened by orienting the sheet.

16. The film laminate as set forth in claim 14 wherein it has an adhesive layer on the metal vapor-deposited layer.

17. A film laminate for printing comprising a polyolefin film obtained by subjecting at least one side of a longitudinally oriented polyolefin film to a corona discharge treatment, forming an ethylene-acrylic acid type copolymer layer on the corona discharge-treated side of the film, then laterally orienting the film; and an anchor layer formed on the modified surface of the polyolefin film subjected to the corona discharge treatment and comprising a binder resin selected from the group consisting of acrylic resins, polyester resins and SBR resins, and an oxazoline group-modified resin.

18. The film laminate as set forth in claim 17 wherein the polyolefin film is a polypropylene film.

19. The film laminate as set forth in claim 17 wherein a recording layer is formed on the anchor layer.

20. The film laminate as set forth in claim 17 wherein an adhesive layer is formed on the surface of the polyolefin film opposite to that carrying the anchor layer.

21. The film laminate as set forth in claim 17 wherein an adhesive layer for metal vapor-deposition containing an anti-blocking agent is formed on the surface of the polyolefin film opposite to that carrying the anchor layer and a metal vapor-deposited layer is formed on the adhesive layer.

22. The film laminate as set forth in claim 15 wherein the polyolefin film is a surface-roughened polyolefin sheet and a metal vapor-deposited layer is formed on the surface of the sheet opposite to that carrying the anchor layer.

23. A method for preparing a film laminate for printing comprising the steps of subjecting at least one side of a longitudinally oriented polyolefin film to a corona discharge treatment, forming an ethylene-acrylic acid type copolymer layer on the corona discharge-treated side of the film, laterally orienting the film, and then forming an anchor layer comprising a binder resin selected from the group consisting of acrylic resins, polyester resins and SBR resins, and an oxazoline group-modified resin, on the modified surface of the surface-modified polyolefin film subjected to the corona discharge treatment.

* * * * *